United States Patent Office 2,794,033
Patented May 28, 1957

2,794,033
REDUCTION OF STEROID PEROXIDES

Gerald D. Laubach, Jackson Heights, N. Y., assignor to Chas. Pfizer & Co., Inc., New York, N. Y., a corporation of Delaware No Drawing. Application March 17, 1954,
Serial No. 416,937

6 Claims. (Cl. 260—397.2)

This invention is concerned with valuable intermediates in the synthesis of therapeutically useful steroid-type compounds. It is also concerned with methods for preparing such intermediates. The present application is a continuation-in-part of application Serial No. 248,091 filed on September 24, 1951 by Gerald D. Laubach, now abandoned.

The introduction of oxygen functions at certain positions of the steroid nucleus, particularly in the C ring at the 11-position, is essential in the preparation of therapeutically active compounds of the steroid series, such as cortisone or compound F. A copending application (Serial No. 224,676, filed on May 4, 1951, by Gerald D. Laubach, now abandoned) discloses the formation of compounds having the desired C11 oxygen via a transannular peroxide linkage between C11 and C14. Later in the synthesis of cortical steroids it is important to hydroxylate the C11 position, i. e. to convert the peroxidic oxygen function at C11 to a hydroxyl group.

The present invention effects the selective reduction of 11,14 steroid peroxides to compounds bearing hydroxyl groups in the nucleus at the same C11 and C14 positions by a process which broadly comprises hydrogenation of the peroxides in the presence of a Raney nickel catalyst or of a "poisoned" or deactivated palladium catalyst. The C-ring transannual 11,14 peroxides are thus converted to 11,14-dihydroxylated compounds, important intermediates in the synthesis of cortical steroids. The peculiar action of the two named catalysts is to render the reduction highly selective: i. e. the peroxide linkage is preferentially hydroxylated, even though the steroid contains nuclear double bonds which hydrogen would normally be expected to saturate at once. This is notably true in the case of the 8,9-unsaturated,11,14 steroid peroxides disclosed in the aforementioned pending application and generally most useful in cortisone synthesis.

This, according to a preferred embodiment of this invention, a compound of the general formula

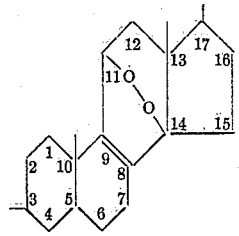

is contacted with hydrogen in an organic solvent system in the presence of either Raney nickel or conventionally "poisoned" palladium, and thereby converted to a novel product, not heretofore known, having the general structure

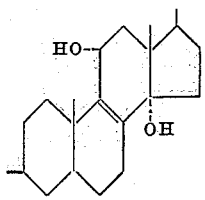

One specific and most useful embodiment of this new process is employed when a nuclear double bond is present in the steroid at the 6,7 position as well as at the 8,9 linkage. In this instance, if one uses Raney nickel as the catalyst, not only will the 11,14 oxygen bridge be hydroxylated, but also the 6,7 double bond will be saturated with hydrogen. All this is achieved, too, without change to the 8,9 double bond, due to the strange and surprising specificity of Raney nickel. If it is desired to retain all nuclear double bonds in a poly-unsaturated steroid, then poisoned palladium is the preferred catalyst. With either the nickel or the palladium material, hydrogenation has no effect on any side chain double bond (a particularly important factor when compounds like ergosterol are used as starting reactant) or, as aforesaid, on a nuclear double bond at the 8,9 position. Hence further operations in cortical steroid syntheses may be readily conducted on the products with considerable ease.

The preparation of the new 8,9-unsaturated 11,14-dihydroxy steroids may be illustrated by the following reactions of a peroxide of isodehydroergosterol, its esters or ethers (i. e. where R is hydroxyl or a radical readily hydrolyzable to hydroxyl). Actually the nature of a C3 or C17 substituent appears quite unimportant. No appreciable alteration in the fundamental reduction reaction seems to occur when these groups are varied widely. The preparation and properties of these isoergosterol derivatives are described in the copending application Serial No. 224,676 referred to above. Their conversion to dihydroxy compounds may be carried out in one of two ways, depending on whether it is desired to retain the 6,7 nuclear double bond or to obtain an 8,9-nuclear monounsaturated material.

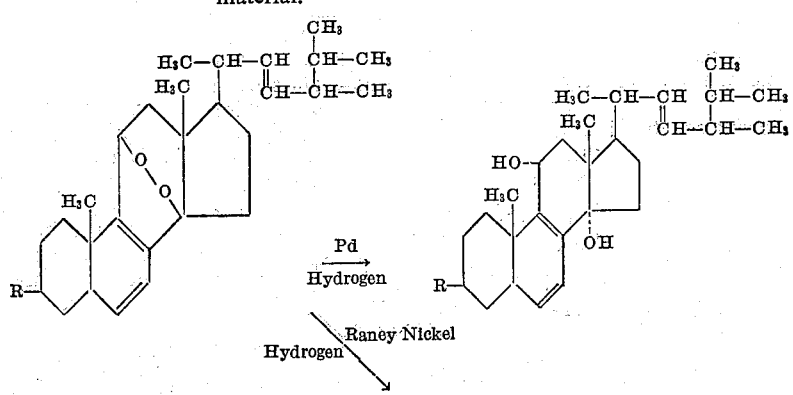

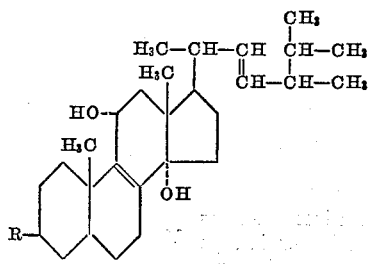

Thus it is seen that the peroxide linkage may be selectively reduced without reducing nuclear double bonds or the $C_{17}$ side chain double bond. The resulting nuclear unsaturated, dihydroxy steroids are valuable compounds and further reactions in the cortisone synthesis series may be carried out.

As examples of the useful reactions to which these highly versatile compounds may be subjected, the following may be mentioned: The 11,14-dihydroxylated products may be selectively oxidized with chromic oxide or a chromate in pyridine, according to well-known methods, to yield the corresponding 11-keto,14-hydroxy steroids. Using a typical product of the present invention as an example, the equation for this reaction is as follows:

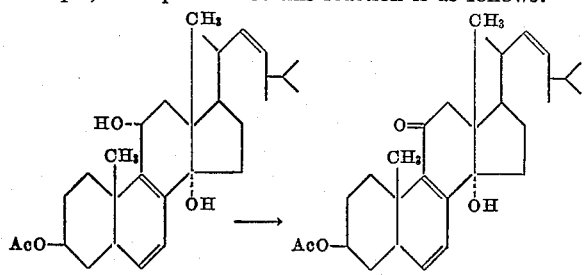

Copending application Serial No. 368,199, filed on July 15, 1953 by Gerald D. Laubach et al., describes a method for the removal of the 14'-OH group by acid dehydration, as follows:

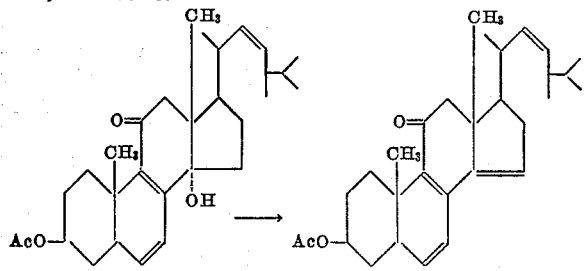

Compounds of this type may then be subjected to selective hydrogenation according to the process described in application Serial No. 317,576, filed on October 29, 1952 by Gerald D. Laubach et al. This process involves contacting the steroid with hydrogen in the presence of W-7 Raney nickel and an alkaline material. By this method both the 6 and 14 double bonds may be saturated, while neither the double bond at the 8 position, nor double bonds which may be present in a side chain such as that of the ergosterol derivatives, are changed. The following equation illustrates this:

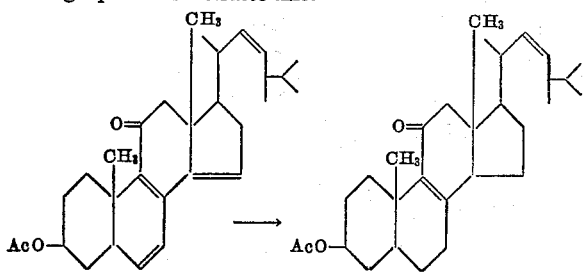

This last compound shown, $\Delta^{8,22}$-ergostadien-3$\beta$-ol-11-one acetate, is a well-known intermediate for the preparation of cortisone.

To return again to the compounds produced by the reaction of this present invention, their versatility is such that they may also be used for the production of cortical hormones by still another method, different from that just described. This other method will now be described.

Copending application Serial No. 249,014, filed on September 29, 1951, by Gerald D. Laubach et al., teaches that steroids of the type obtained in the present invention, i. e. those having at least one nuclear double bond at the 8 position and bearing hydroyl groups at the 11 and 14 positions, can be readily isomerized to compounds in which the double bond is shifted to the 8(14) position and the 14-hydroxyl is shifted to the 9 position. This is accomplished by digesting the steroid in an acid. If a double bond is present in the 6 position it is not affected, and the reaction will also go without the presence of this double bond. A typical equation for this reaction is as follows:

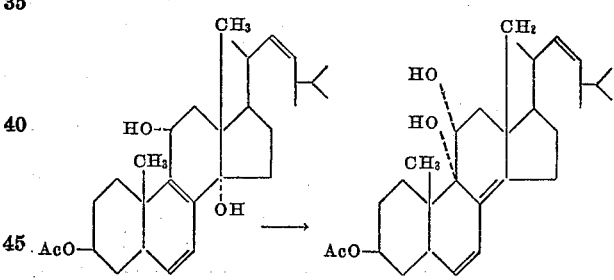

By standard methods, this $C_{17}$ side chain may be cleaved to give a short chain containing three carbons. This compound may then be treated with hydrogen in the presence of a strong acid and of a noble metal catalyst, according to the method of copending application Serial No. 276,050, filed on March 11, 1952 by Gerald D. Laubach. Nuclear double bonds are thereby saturated and the $C_9$ oxygen function is reduced, while neither the $C_3$ nor $C_{11}$ oxygen is attacked. As the critical and difficult to obtain $C_{11}$ oxygen has been retained intact, well-known standard methods now suffice to complete the synthesis of therapeutically active cortical steroids.

In conducting the process of this invention, the various operating conditions suitable in commercial practice may be varied widely and are naturally interdependent. Generally reduction is effected at approximately room temperature, that is from about 15° to about 25° C., and at a pressure of hydrogen substantially between one and about six atmospheres. The reaction is thus completed within a reasonably short time (one to ten hours). The reaction usually slows markedly after absorption of the theoretical quantity of hydrogen, e. g. approximately 2 moles when both the 11,14 and 6,7 positions are attacked, or 1 mole for only the 11,14. Organic solvents, e. g. ethers like dioxane and lower alcohols or esters like ethyl acetate, may be used in conducting the reaction, the steroid peroxide being dissolved therein, catalyst added, and the hydrogen bubbled through the system. The reduction products are finally recovered by any desired means, especially by concentrating the solution and then crystallizing them out directly or by trituration with a low boiling petroleum hydrocarbon or the like.

As previously discussed, there are two specific catalysts which provide the desired selectivity in reduction and thus are useful in this process. Both are well-known substances and readily obtainable on the open market. "Poisoned" palladium may be prepared by deactivating palladium with such reagents as sulfur-quinoline, metals like lead, etc. Raney nickel may be made by treating aluminum-nickel alloys with caustic. The optimum quantity of either catalyst for a given reaction is readily determinable by one skilled in the field. Conventional amounts are normally satisfactory, or say substantially between about 5% of the weight of steroid used and about 5 times the weight of the compound.

The following examples are given by way of illustration and are not intended as a limitation of this invention. Indeed, as many apparently widely different embodiments of the present invention may be made without departing from the spirit and scope hereof, it is to be understood that the invention is limited as defined in the appended claims only.

*Example I*

ERGOSTA-6,8,22-TRIENE-3β-11,14-TRIOL 3-ACETATE

Palladium on a calcium carbonate carrier was deactivated with lead (5% Pd–4% Pb) and saturated with hydrogen. A solution of 0.472 g. (0.001 mole) of isodehydroergosteryl acetate peroxide (melting point 157.0°–158.0° C.) in 30 ml. of ethyl acetate was hydrogenated over 0.2 g. of this catalyst at room temperature under one atmosphere of hydrogen. Hydrogen absorption ceased abruptly at the end of 2 hours after 25.2 ml. of hydrogen (102% of 1 mole) had been taken up. The reaction mixture was filtered, and the filtrate after concentration to dryness afforded directly 0.435 g. (92%) of nearly pure glycol, melting point 140.6°–157.2° C. Recrystallization from ether-petroleum ether (B. P. 30–60° C. of the desired 6,7,8,9-nuclear diunsaturated, 11,14-dihydroxylated steroid product provided long silky needles, melting point 158.6°–162.2° C. An analytical sample recrystallized from methanol melted at 157.4°–160.0° C.

*Anal.*—Calcd. for $C_{30}H_{46}O_4$: C, 76.65; H, 9.86; O, 13.58. Found: C, 76.82; H, 9.74; O, 13.89 (direct oxygen).

The ultraviolet absorption spectrum of the product was obtained. ε max. at 272 mμ–3340, log ε=3.52. Peroxide determination by the method of Bergmann and Skau, J. Org. Chem., vol. 3, p. 166 (1938), demonstrated the absence of peroxidic oxygen and thus showed complete hydroxylation of the original 11,14 oxygen bridge. The equation for the reaction of this example is as follows:

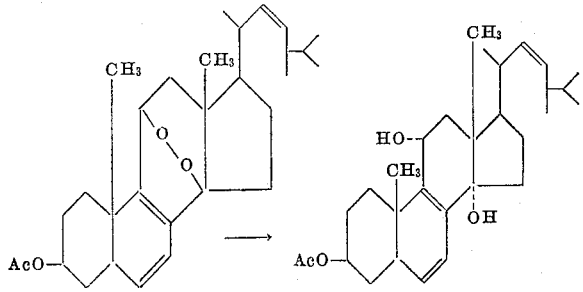

*Example II*

The procedure of Example I was repeated, using various ester and ether groups at the 3 position instead of the acetate group previously used. Useful groups include, for example, formate, propionate and benzoate among the esters and methyl, ethyl and benzyl among the ethers. The reaction was also run using the free hydroxyl group. None of these changes produced any effect on the overall reaction, which proceeded as before to give the 6,7,8,9-nuclear diunsaturated, 11-14-dihydroxylated product.

*Example III*

ERGOSTA-8,22-DIENE-3β,11,14-TRIOL 3-ACETATE

A solution of 0.234 g. (0.0005 mole) of isodehydroergosteryl acetate peroxide (melting point 152.0–153.6° C.) in 12 ml. of anhydrous peroxide-free dioxane was hydrogenated over 0.750 g. of Raney nickel catalyst at room temperature and atmospheric pressure. After about three hours the hydrogen uptake amounted to 24.5 ml. (111% of 2 moles), and absorption had essentially ceased. Filtration and concentration under vacuum afforded a crude, slightly oily, white solid which, on trituration with petroleum ether, yielded 0.091 g. (38.9%) of crisp white solid, melting point 144.4°–150.6° C.

Standard spectrographic analysis of this product demonstrated that it was the desired 8,9-nuclear monounsaturated, 11,14-dihydroxylated derivative of isoergosterol. Its ultraviolet absorption spectrum indicated the presence of but a minor proportion of diene, ε max. 248 mμ= 1730, log ε=3.24. An active hydrogen determination by a modified Zerewitinoff method showed the presence of two hydroxyl functions. The equation for the reaction of this example is as follows:

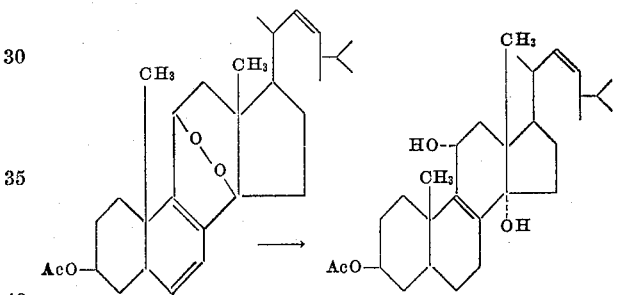

*Example IV*

The procedure of Example III was repeated, using various esters and ether groups at the 3 position instead of the acetate group previously used. Useful groups include, for example, formate, propionate and benzoate among the esters and methyl, ethyl and benzyl among the ethers. The reaction was also run using the free hydroxyl group. None of these changes produced any effect on the overall reaction, which proceeded as before to give the 8,9-nuclear-monounsaturated, 11-14-dihydroxylated product.

What is claimed is:

1. A process for the selective reduction of an 8,9-unsaturated, 11,14-peroxide steroid of the ergosterol class to an 8,9-unsaturated 11,14-dihydroxylated steroid, which process comprises hydrogenating said peroxide in the presence of a catalyst from the group consisting of Raney nickel and poisoned palladium.

2. A process for the selective reduction of an 8,9-unsaturated, 11,14-peroxide steroid of the ergosterol class to an 8,9-unsaturated 11,14-dihydroxylated steroid, which process comprises contacting said peroxide with hydrogen in an organic solvent system in the presence of a catalyst chosen from the group consisting of Raney nickel and poisoned palladium.

3. The process of claim 1 wherein the steroid peroxide is selected from the group consisting of peroxides of isodehydroergosterol, and its 3-hydrocarbon carboxylic acid esters wherein the ester group has from 1 to 7 carbon atoms.

4. A process for the selective reduction of a steroid selected from the class consisting of isodehydroergosterol 11,14-peroxide and its 3-hydrocarbon carboxylic acid esters wherein the ester group has from 1 to 7 carbon atoms, to the corresponding 11,14 - dihydroxylated steroid, which process comprises hydrogenating said peroxide in an organic solvent system in the presence of Raney nickel.

5. A steroid compound having the formula

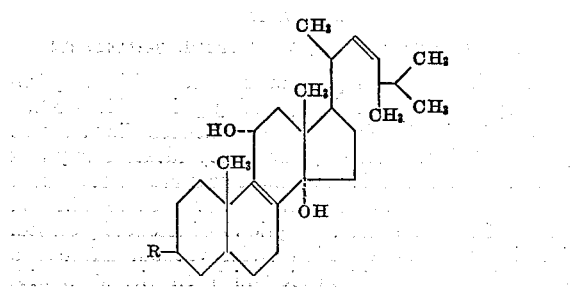

wherein R is a group selected from the class consisting of hydroxyl and a hydrocarbon carboxylic acid ester group having from 1 to 7 carbon atoms.

6. A steroid having the formula

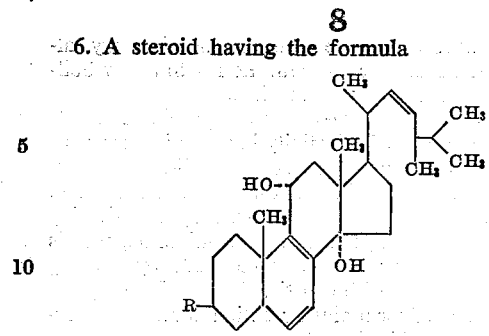

wherein R is a group selected from the class consisting of hydroxyl and a hydrocarbon carboxylic acid ester group having from 1 to 7 carbon atoms.

References Cited in the file of this patent

Laubach: Journal Am. Chem. Soc. 75 1514–1515 (1953).